US010316994B2

(12) United States Patent
Weaver

(10) Patent No.: US 10,316,994 B2
(45) Date of Patent: Jun. 11, 2019

(54) METHOD AND APPARATUS FOR WINDING A LINER INSIDE A HOST PIPE

(71) Applicant: ELEGANT TECHNICAL SOLUTIONS PTY LIMITED, Strathfield, New South Wales (AU)

(72) Inventor: Ronald John Weaver, Strathfield (AU)

(73) Assignee: ELEGANT TECHNICAL SOLUTIONS PTY LIMITED, Strathfield, New South Wales (AU)

(*) Notice: Subject to any disclaimer, the term of this patent is extended or adjusted under 35 U.S.C. 154(b) by 373 days.

(21) Appl. No.: 14/439,497

(22) PCT Filed: Oct. 29, 2013

(86) PCT No.: PCT/AU2013/001250
§ 371 (c)(1),
(2) Date: Apr. 29, 2015

(87) PCT Pub. No.: WO2014/066934
PCT Pub. Date: May 8, 2014

(65) Prior Publication Data
US 2015/0247593 A1 Sep. 3, 2015

(30) Foreign Application Priority Data
Oct. 29, 2012 (AU) .............................. 2012904753

(51) Int. Cl.
*F16L 11/16* (2006.01)
*B29C 63/32* (2006.01)
(Continued)

(52) U.S. Cl.
CPC .............. *F16L 11/16* (2013.01); *B29C 63/32* (2013.01); *F16L 55/1655* (2013.01);
(Continued)

(58) Field of Classification Search
CPC ........ F16L 11/16; F16L 11/14; F16L 55/1655; B29C 53/72; B29C 53/78; B29C 53/58;
(Continued)

(56) References Cited

U.S. PATENT DOCUMENTS 5,799,701 A * 9/1998 Kitahashi .............. B29C 53/584
138/154
6,234,226 B1 * 5/2001 Kitahashi ............ F16L 55/1655
138/97
(Continued)

FOREIGN PATENT DOCUMENTS

AU 705061 5/1999
AU 734012 5/2001
(Continued)

OTHER PUBLICATIONS

Supplementary European Search Report for Application No. EP 13 85 0660 dated Jul. 27, 2016.
(Continued)

*Primary Examiner* — Christopher M Koehler
(74) *Attorney, Agent, or Firm* — Alston & Bird LLP

(57) ABSTRACT

The invention provides methods and apparatus for producing a spirally wound pipe or pipe liner, and also to a web for forming a spirally wound pipe or pipe liner. One aspect of the invention provides a method and an associated machine of winding a helically wound pipe from a web (200) having transversely spaced apart connecting formations (310, 320) adapted to interlock when the web is wound in a helical path and adjacent edge portions (300a. 300b) of the web overlap one another, wherein an exterior support means (400) for the connecting formation at the terminus of the pipe being helically wound from the web is provided, and a radially outwardly directed force is applied against an inner face (220) of the web and the support means (400) to pinch connecting formations into interlocking engagement. A fur- (Continued)

ther aspect of the invention provides an elongated web (200) comprising a wall portion (210) bound by edge portions (300*a*. 300*b*) and adapted to form a pipe by spirally winding said web and joining adjacent said edge portions, wherein a distal end of joined edge portions (330) of the web projecting from the wall portion (210) of the web is less than a spacing distance defined by a spacer rib (350) projecting from the wall portion, when the web is spirally wound and adjacent edge portions are joined together.

9 Claims, 6 Drawing Sheets

(51) Int. Cl.
| | | |
|---|---|---|
| *F16L 55/165* | (2006.01) | |
| *F16L 55/18* | (2006.01) | |
| *B29C 53/78* | (2006.01) | |
| *B29C 65/58* | (2006.01) | |
| *B29C 53/58* | (2006.01) | |
| *B29C 53/72* | (2006.01) | |
| *B29L 23/00* | (2006.01) | |
| *B29C 65/00* | (2006.01) | |

(52) U.S. Cl.
CPC ............ *F16L 55/18* (2013.01); *B29C 53/587* (2013.01); *B29C 53/72* (2013.01); *B29C 53/78* (2013.01); *B29C 65/58* (2013.01); *B29C 66/12425* (2013.01); *B29C 66/12464* (2013.01); *B29C 66/4322* (2013.01); *B29C 66/4329* (2013.01); *B29C 66/524* (2013.01); *B29C 66/5326* (2013.01); *B29C 66/61* (2013.01); *B29C 66/71* (2013.01); *B29L 2023/006* (2013.01)

(58) Field of Classification Search
CPC .............. B29C 63/32; B29C 66/12425; B29C 66/12464; B29C 66/4322; B29C 66/4329; B29C 66/61
See application file for complete search history.

(56) References Cited

U.S. PATENT DOCUMENTS

| | | | |
|---|---|---|---|
| 6,637,092 | B1 | 10/2003 | Menzel et al. |
| 8,905,105 | B2 | 12/2014 | Yamane et al. |
| 2004/0013472 | A1* | 1/2004 | Akimoto ............. F16L 55/1655 405/184.2 |
| 2009/0283646 | A1 | 11/2009 | Sugahara |
| 2010/0008731 | A1* | 1/2010 | Kakine ................... B29C 53/72 405/184.2 |
| 2010/0184577 | A1* | 7/2010 | Nakagaki .............. B29C 53/785 493/299 |
| 2013/0019982 | A1 | 1/2013 | Kobayahi |
| 2013/0247632 | A1 | 9/2013 | Nakagaki et al. |

FOREIGN PATENT DOCUMENTS

| | | | |
|---|---|---|---|
| AU | 2006280913 | 2/2007 | |
| AU | 2008273303 | 1/2009 | |
| AU | 746929 | 5/2009 | |
| AU | 2010279168 | 2/2012 | |
| AU | 2011236216 | 8/2012 | |
| EP | 0 450 220 A1 | 10/1991 | |
| JP | 10-227389 | 8/1988 | |
| JP | 02-041230 | 2/1990 | |
| JP | H02 41230 A | 2/1990 | |
| JP | WO 9509725 A1 * | 4/1995 | ............ B29C 53/78 |
| JP | 08-034059 | 2/1996 | |
| JP | 2000-272007 | 10/2000 | |
| JP | 2000 272007 A | 10/2000 | |
| JP | 2005-342915 | 12/2005 | |
| WO | WO 95/09725 A1 | 4/1995 | |

OTHER PUBLICATIONS

Written Opinion for International Application No. PCT/AU2013/001250 dated Jan. 20, 2014.
International Preliminary Report on Patentability (Chapter II) for International Application No. PCT/AU2013/001250 dated Oct. 27, 2014.
International Search Report for PCT/AU2013/001250 dated Jan. 20, 2014.

* cited by examiner

METHOD AND APPARATUS FOR WINDING A LINER INSIDE A HOST PIPE

CROSS-REFERENCE TO RELATED APPLICATIONS

This application is a U.S National Phase under 35 U.S.C § 371 of International Application PCT/AU2013/001250, filed Oct. 29, 2013, which claims priority to Australian Patent Application No. 2012904753, filed Oct. 29, 2012, each of which is incorporated herein in its entirety by reference.

TECHNICAL FIELD

The present invention relates to methods and apparatus for producing a spirally wound pipe or pipe liner, and also to a web for forming a spirally wound pipe or pipe liner. The invention will be described hereinafter with reference to this application, although it will be appreciated that the invention is not necessarily limited to this particular field of use.

BACKGROUND ART

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

There are various well known and conventional methods for repairing pipes, in particular underground pipes. In recent years, new mechanisms have developed for providing a plastic internal liner for the damaged pipe. This permits the damaged pipe to remain in place during and after repair, limits excavation and provides a rapid and relatively inexpensive repair.

One particular technique, and which is subject of several Australian and overseas patents, involves lining a damaged pipe with a helically wound pipe formed from an extruded plastic web (sometimes referred to as a "profile") with interlocking male and female edges. The plastic web is commonly formed from PVC, however other plastics materials could alternatively be used. In one such form, the pipe liner is installed as shown in FIG. 1. A winding machine 10 is lowered into the maintenance hole 20 and positioned at its base. A spool 40 of the profile is provided at the surface. The profile is fed to the winding machine 10 where it is helically wound into the liner 60. As the profile is wound, the male and female edges of adjacent profile are interconnected to form the liner 60.

The profile is pulled into the winding machine 10 using a hydraulic drive. The machine 10 has several radial arms with rotating end rollers causing the whole machine to rotate inside the host pipe and lay the profile against the wall of the host pipe. While the machine rotates it also moves along the host pipe making the new pipe liner 60 behind it.

Ideally, the new liner pipe is laid intimately against the wall of the existing host pipe. For example to rehabilitate a pipeline at internal diameter 1000 mm, a liner of external diameter 1000 mm would be desirable, and depending on the wall thickness of the new pipe the internal pipe is therefore reduced by this amount. This allows the pipe to be installed at a maximum diameter to optimise hydraulic efficiency. An example of this technology is that which has been developed and patented by Rib Loc Pty Ltd under (Australian Patent No. 746923).

There are, however, a number of inherent limitations of the technology described in AU 746929, including:

(i) The profile requires a minimum longitudinal stiffness/rigidity such that the male/female locking members are able to engage without the need for external compressive force acting on them. This limits the range of profiles that can be used.

(ii) The apparatus described in AU 746929 relies on the tension in the profile to engage the locking members. Therefore, as the diameter of the wound pipe increases the size of the "entry angle" becomes progressively shallower, where the locking members will no longer engage properly and therefore limits the diameters that the profile can be wound to (see FIG. 2 for the "entry angle").

(iii) The invention which is the subject of AU 746929 relies on the forces acting on the driven strip and the reactive force provided by tension in adjacent convolution(s) of the profile for the locking members to properly engage. This can mean less reliable engagement. Should the locking members not engage during the installation, the liner would need to be repaired or re-installed.

It is therefore an object of the present invention to overcome or ameliorate at least one of the disadvantages of the prior art or to provide a useful alternative.

SUMMARY OF INVENTION

To this end, a first aspect of the present invention provides a method of winding a helically wound pipe from a web having transversely spaced apart connecting formations adapted to interlock when the web is wound in a helical path and adjacent edge portions of the web overlap one another, said method comprising the steps of:

feeding the web in a substantially axial direction with respect to the axis of the pipe being wound;

driving the web around the outside of a plurality of circumferentially spaced guide rollers arranged to form a guide to enable the web to follow the helical path;

providing exterior support means for supporting the connecting formation at the terminus of the pipe being wound;

applying a radially outwardly directed force against the driven web and said exterior support means, thereby pinching the overlapping connecting formations into interlocking engagement;

wherein said exterior support means is located wholly within the outer diameter of the pipe as the pipe is wound.

The exterior support means acts to support an exterior face of the web during winding, and lies wholly within said helical path and the outer diameter of the pipe being wound.

The present invention provides an external compressive force to lock the male/female locking members on adjacent edges of the plastic profile during installation. The invention does not rely on the properties of the profile or the tension created in the adjacent profile in order to couple the male and female edges of the plastic profile together, enabling large diameter pipes to be formed. In fact, an almost unlimited diameter pipe can be formed. Furthermore, because an external compressive force is applied to engage the male/female locking members together during installation, the need for rigidity in the profile is reduced.

The present invention does not require an annulus space between the host pipe and the new pipe to operate, and therefore overcomes the limitations above while still achieving a new liner pipe or conduit that can be intimately wound against the existing host pipe. This may be achieved, for example, by providing a support roller on the outside of the pipe being wound and a corresponding roller on the inside of the pipe which pinches or squeezes the overlapping connecting formations into interlocking engagement. Alternatively, it may be achieved by providing an external support surface over which the web slides, and wherein a corresponding roller or support surface on the inside of the pipe which acts to force the overlapping connecting formations into interlocking engagement.

The skilled person will appreciate that the present invention relates to the use of spirally wound pipes whereby a continuous liner is installed into a host pipe, and is particularly suitable for trenchless rehabilitation of culverts, wastewater and storm water pipes, but could also be utilised in other applications that require a plastic liner.

Prior art methods and apparatus have relied on the mutually opposed forces of the driven web and the edge portion at the terminus of the wound pipe to lock adjacent webs together. To explain, the driven web has an inherent tendency to "lay flat" (caused by its rigidity) causing radially outwardly directed forces, whereas the tension in adjacent convolution of the web causes a "reactive force" against the outward forces. These opposing forces cause the webs to press together to cause them to interlock. However, there are a number of disadvantages with this approach, as discussed above. The present invention is a significant improvement over this prior art method, as the present invention provides a positive "pinching action" to interlockingly engage overlapping adjacent connecting formations together. This method provides many advantages, as discussed herein.

In preferred embodiments, the web is fed in a substantially axial direction with respect to the axis of the pipe being wound and is passed between at least one pair of drive rollers located inside of the helical path to the circumferentially spaced guide rollers at the terminus of the pipe being wound.

In a preferred embodiment, the exterior and or interior support means is a plate over which the connecting formation at the terminus of the pipe slide and which acts as a rigid support to enable the connecting formation of the driven web to be pinched together. It will be appreciated that the combined action of the support surface, which in one embodiment is configured to be radially opposite another rigid support surface, provides a net compressive force on the overlapping edges of the web to interlock the overlapping edge portions together.

In a preferred embodiment, the outer and inner support plates are configured in the shape of a "V" to create a "nip point", whereby the progressively converging plates cause the connecting formation of the driven web to interlockingly engage with the connecting formation at the terminus of the pipe being wound.

In an alternative embodiment, the exterior support means takes the form of a roller positioned exterior of the pipe being wound and the radially outwardly directed force is provided by a compression roller biased into compressive engagement with the exterior roller. As the terminal winding of the pipe being wound and the newly-added web are fed between the rollers they experience a compressive force and the overlapping connecting formations are squeezed into interlocking engagement.

The present invention enables the formation of a liner pipe that can be in intimate contact with the host pipe by using a winding machine that has an external pressure (compression) means or support surface located on the outside of the liner pipe being formed. The 'intimate contact' referred to above should be understood as the distal ends of the ribs being in contact with the interior of the host pipe, as discussed further below. The ability to position a support surface within a small space between the connecting formations and the host pipe provides the benefit of being able to wind at large diameters reliably and without the need to have a relatively stiff web. Other technologies may employ an external pressure means however the liner cannot be produced such that it is in intimate contact with the host pipe.

A second aspect of the present invention provides a machine for winding a helically wound pipe from a web having complementary connecting formations extending along opposite edge portions thereof and which are adapted to interlock when the web is helically wound, the machine comprising:

a frame having circumferentially spaced guide rollers adapted to bear against the inner periphery of the pipe being wound, the rollers forming a guide to enable the web to follow a helical path along which the web is directed when the machine is in use;

web drive roller means mounted to the frame for driving/pulling the web around the outside of the rollers;

drive means mounted to the frame for driving the web drive roller means, wherein the web drive roller means is located wholly inside the helical path;

an exterior support means for the connecting formation at the terminus of the pipe being wound;

means for applying a radially outwardly directed force against an inner face of the driven web and the support means, thereby pinching the overlapping connecting formations into interlocking engagement;

wherein as the pipe is wound said exterior support means is wholly located within the outer diameter of the pipe being wound.

Preferably, the wall of the web includes at least one spacer rib projecting therefrom, with the distal end of the spacer rib and the wall thereby defining a spacing distance. In accordance with this aspect of the invention, the exterior support means is wholly located within the spacing distance as the pipe is wound. As a result, exterior support can be provided to the web to facilitate interlocking engagement of the connecting formations, whilst still ensuring that the resultant pipe or liner is formed in intimate contact with the bore of the host pipe.

A third aspect of the present invention provides an elongated web for use in the method according to the first aspect of the invention or in the machine according to the second aspect of the invention, the web comprising:

a wall portion bounded by edge portions and adapted to form a pipe by spirally winding said web and joining adjacent said edge portions, wherein said wall portion comprising at least one spacer rib projecting therefrom, the distal end of the spacer rib and the wall portion defining a spacing distance, wherein the edge portions and spacer rib are configured such that as said web is spirally wound and adjacent said edge portions joined together, the distal end of the joined edge portions project from the wall portion less than the spacing distance and define a space within which to accommodate said exterior support means.

Preferably, the edge portions include locking formations for joining adjacent edge portions. More preferably, the edge portions of the web include a male locking formation along a first edge and a complementary female locking formation along a second edge.

Preferably, the wall portion of the web includes a helix compensation zone which permits the web to expand or contract laterally in order to compensate for helix changes in the pipe.

Preferably, the helix compensation zone is integrally formed in the wall portion of the web.

Preferably, the helix compensation zone comprises a generally U-shaped wall section.

Preferably, the helix compensation zone said is located adjacent a locking formation.

It will be appreciated that the elongated web according to a third aspect is particularly useful in the method according to the first aspect and when used in the machine according to the second aspect.

It will be appreciated that the rib projects a certain distance "X" from the wall portion, and that the locking edge portions are configured to project a certain distance "Y" from the wall portion when locked together, and since X>Y (i.e. the rib is 'taller' than the locked edge portions) a relatively small space is provided within which to accommodate the support means. This enables the support means to be used in situ together with the means for applying radially outwardly directed force to pinch the edge portions together into interlocking engagement and enables the pipe to be formed with no annular space between the distal end of the rib and the host conduit. As a result the wound pipe can be formed of a diameter so as to be in intimate contact with the bore of the host conduit.

Moreover, provision of the support means enables large diameter pipes to be wound and to more reliably lock the edge portions together into locking engagement.

A fourth aspect of the present invention provides a helically wound pipe when produced by the method according to the first aspect.

A fifth aspect of the present invention provides a conduit, pipe or pipe liner produced from an elongated web according to the third aspect.

The skilled addressee will understand that the invention comprises the embodiments and features disclosed herein as well as all combinations and/or permutations of the disclosed embodiments and features.

It should be noted that, unless the context clearly requires otherwise, throughout the description and the claims the words "comprise", "comprising", and the like are to be construed in an inclusive sense as opposed to an exclusive or exhaustive sense; that is to say, in the sense of "including, but not limited to".

BRIEF DESCRIPTION OF DRAWINGS

One or more preferred embodiments of the present invention will now be described, by way of example only without limitation, with reference to the accompanying drawings in which.

BEST MODE(S) FOR CARRYING OUT THE INVENTION

The present invention will now be described with reference to the following examples which should be considered in all respects as illustrative and non-restrictive.

Figure 1:
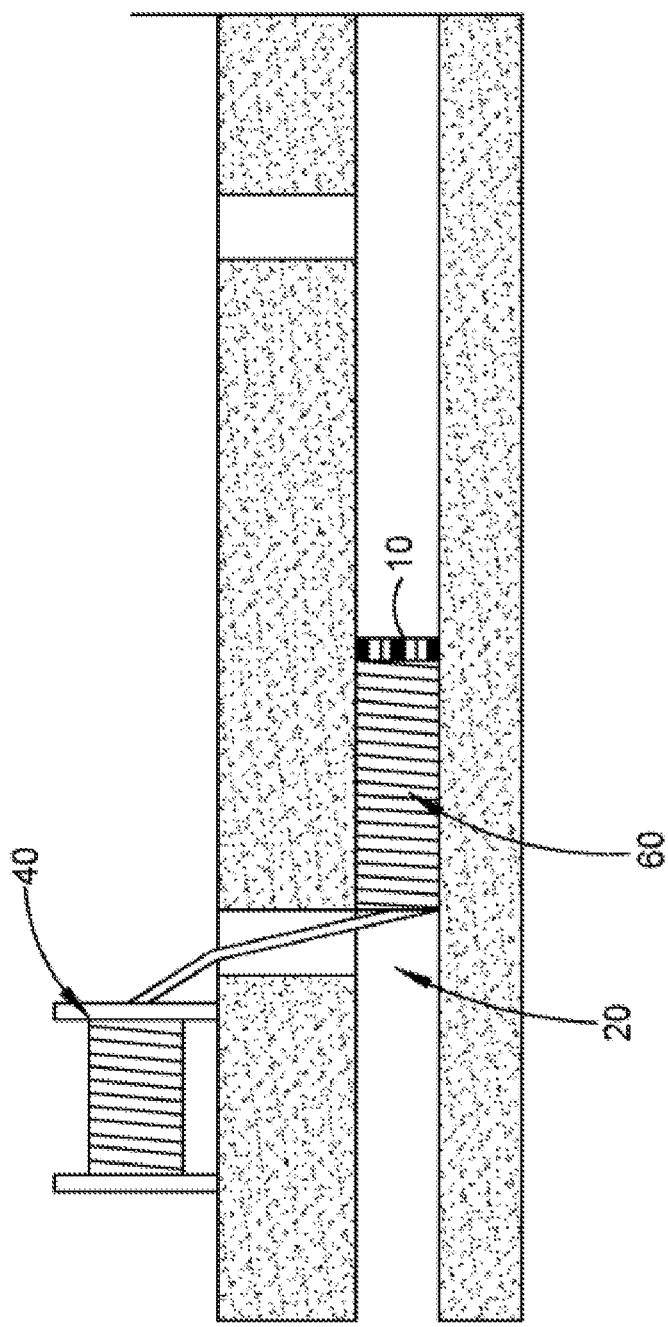
FIG. 1 is a diagrammatic view of a conventional installation system for spirally wound pipes.
Figure 2:
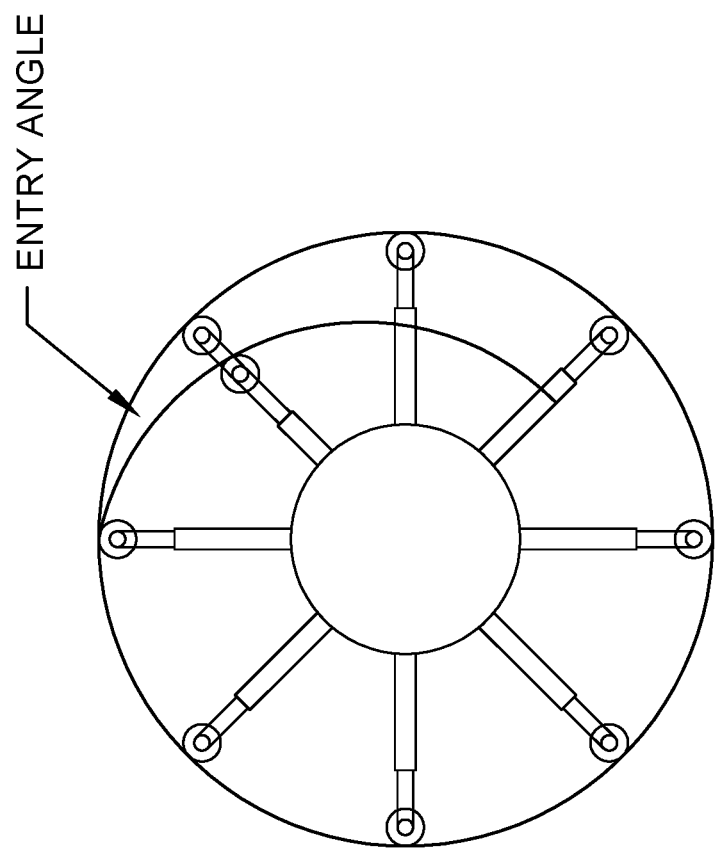
FIG. 2 is front view of the machine of the invention showing a spirally wound pipe and an incoming section of web and the "entry angle" between the incoming section and the terminal end of the pipe.
Figure 3:
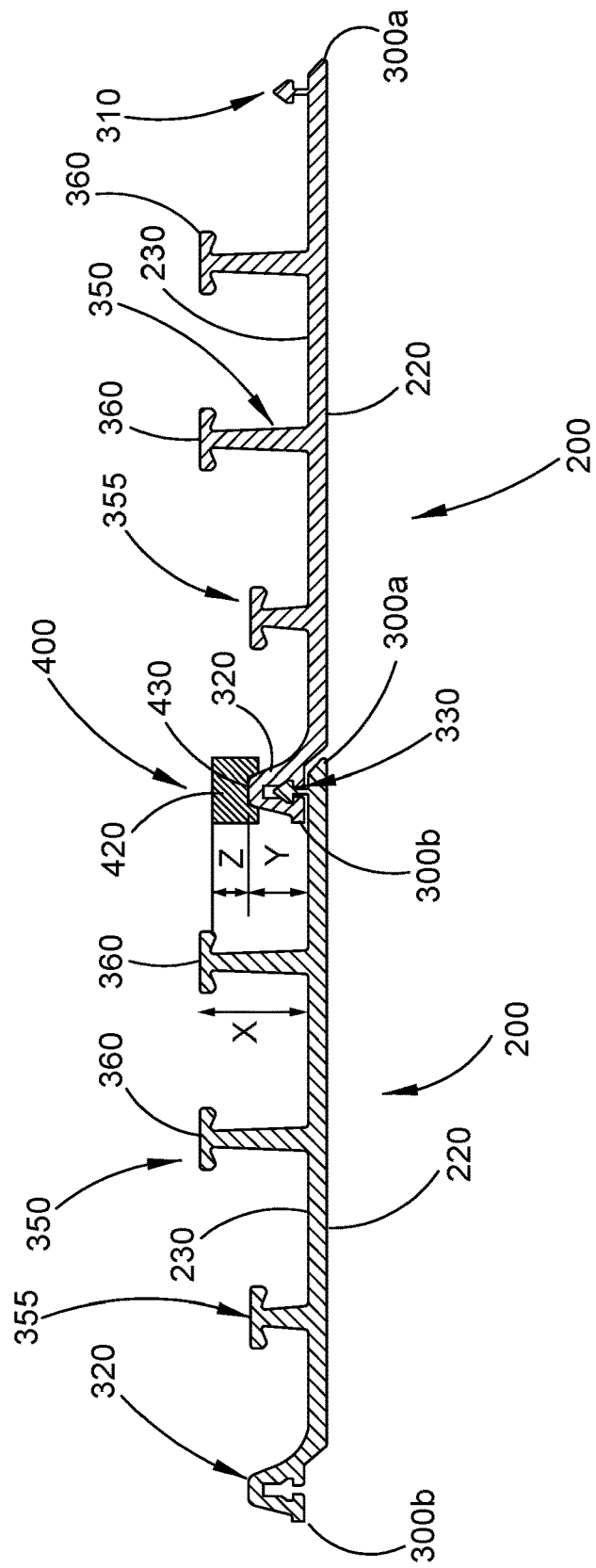
FIG. 3 is a transverse cross-sectional view of two lengths of joined web according to the invention is shown.

FIG. 3 depicts a transverse cross-sectional view of two sections of joined web 200 according to the present invention. The web 200 has a constant cross section along its length and is preferably extruded from a suitable polymer material such as, for example, PVC. The web 200 can take a range of sizes and thicknesses in order to provide a liner with sufficient stiffness to meet the specific design requirements of the installation.

The web 200 comprises a substantially planar wall portion 210 bounded by opposing first and second edge portions 300a, 300b. The opposing edge portions 300a, 300b of each web feature a male locking formation 310 and a complementary female locking formation 320. As the web is spirally wound adjacent edge portions 300a, 300b of the winding are joined by the interlocking of the complementary male and female connecting formations to form a continuous connection 330.

The wall 210 of web 200 has a first, substantially planar, face 220 which in use forms the bore of the liner. The wall 210 has a second face 230 which includes at least one spacer rib 350 projecting transversely therefrom. The spacer ribs 350 have a generally T shaped profile, with an outer bearing surface 360 provided at the distal end of the rib. In use, the second face 230 forms an outer face of the wound liner, with ribs 350 extending from the outer face. The distal ends of the ribs 350 define the outer diameter of the wound liner. The bearing surfaces 360 of the ribs 350 seating against the bore of the pipe being lined and are in intimate contact with the bore around the entire periphery of the liner.

The distal end of the spacer rib 350 and the wall portion define a spacing distance "X", wherein the edge portions 300a, 300b and spacer ribs 350 are configured such that when said web 200 is spirally wound and adjacent edge portions 300a, 300b are joined together to create interlocked edge portions 330, the distal end of the joined edge portions 330 project from the wall portion 210 less than the spacing distance (distance "Y") defined by the spacer rib 350.

It will be appreciated that the spacer rib 350 projects a certain distance "X" from the wall portion 210, and that the locking edge portions are configured to project a certain distance "Y" from the wall portion when locked together, and the web is configured such that since X>Y (i.e. the rib is 'taller' than the locked edge portions) a residual space "Z" is provided within which to accommodate an external support means 400. Advantageously this enables the external support means 400 to be used in situ to pinch the edge portions 300 together into locking engagement and enables the pipe to be formed with no annular space between the distal ends of the ribs and the host conduit/pipe. Provision of an external support means 400 enables large diameter pipes to be wound and to more reliably lock the edge portions 300 together into locking engagement.

The external support means 400 preferably takes the form of a fixed plate 420. The plate includes a support face 430 over which an outer face of the web passes as the liner is wound. The external support means 400 directly supports the web at the point of connection of the male and female locking formations, with an outer face of the female locking formation 320 being directly supported by the fixed plate 420. In the embodiment depicted in FIG. 3 the support face 430 of the fixed plate 420 includes a complementary recess which receives an outer face of the female locking formation 320 and directly supports the web at the terminus of the pipe being wound.

The outer faces 360 of the spacer ribs 350 define the outer diameter of the pipe or liner being wound. In accordance with the invention, the plate 420 is located wholly within the outer diameter of the pipe or liner being wound. In this way, intimate contact can be created between the liner and the bore of the host pipe around the entire diameter of the liner.

Figure 4:
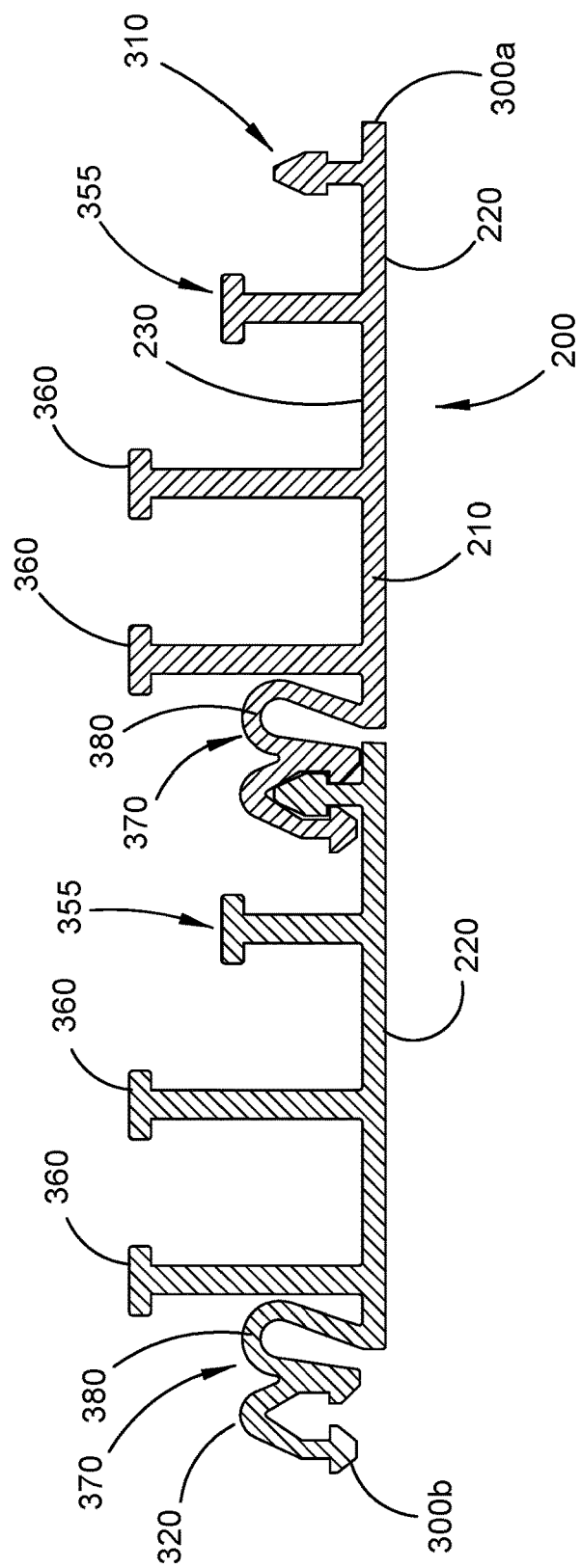
FIG. 4 depicts a transverse cross-sectional view of two sections of joined web and illustrates a further preferred embodiment of the web.

FIG. 4 depicts a transverse cross-sectional view of two sections of joined web 200, and illustrates a further preferred embodiment of the web 200. This embodiment the web 200 includes a helix compensation zone 370 which permits said web to expand or contract laterally in order to compensate for helix changes in the pipe.

As a result, the helix compensation zone 370 enables the width of the web to vary in response to lateral forces. Advantageously, the expansion or contraction of the web provides for helix compensation. As the diameter of the pipe being wound varies so also does the helix angle. Advantageously, the incorporation of a zone of compensation in the wall of the web means that the winding machine does not need to compensate for the helix and hence enables the machine greater degree of flexibility when winding pipes of varying diameters.

In preferred embodiment depicted in FIG. 4 the helix compensation zone takes the form of a generally U-shaped wall section 380 immediately adjacent the female locking formation 320. However it should be appreciated that the compensation zone may be located in other locations in the wall 210 of the web and make take other cross-sectional forms such as, for example, a W-shape. Similarly, the web 200 may incorporate more than one compensation zone.

The invention also relates to a method of winding a helically wound pipe from a web 200 having connecting formations 300 spaced apart transversely on the web 200 and adapted to interlock when the web 200 is wound in a helical path and adjacent edge portions 300 of the web overlap one another. The method comprises the steps of feeding the web in a substantially axial direction with respect to the axis of the pipe being wound and driving the web around the outside of a plurality of circumferentially spaced guide rollers (not shown) arranged to form a guide to enable the web to follow the helical path. An exterior support means 400 is provided for the connecting formation at the terminus of the pipe being wound. A radially outwardly directed force is applied against the driven web 200 and the support means 400, thereby pinching the overlapping connecting formations into interlocking engagement.

It will be appreciated that the radially outwardly directed force is preferably applied directly against the support means, with the driven web therebetween.

Figure 5:
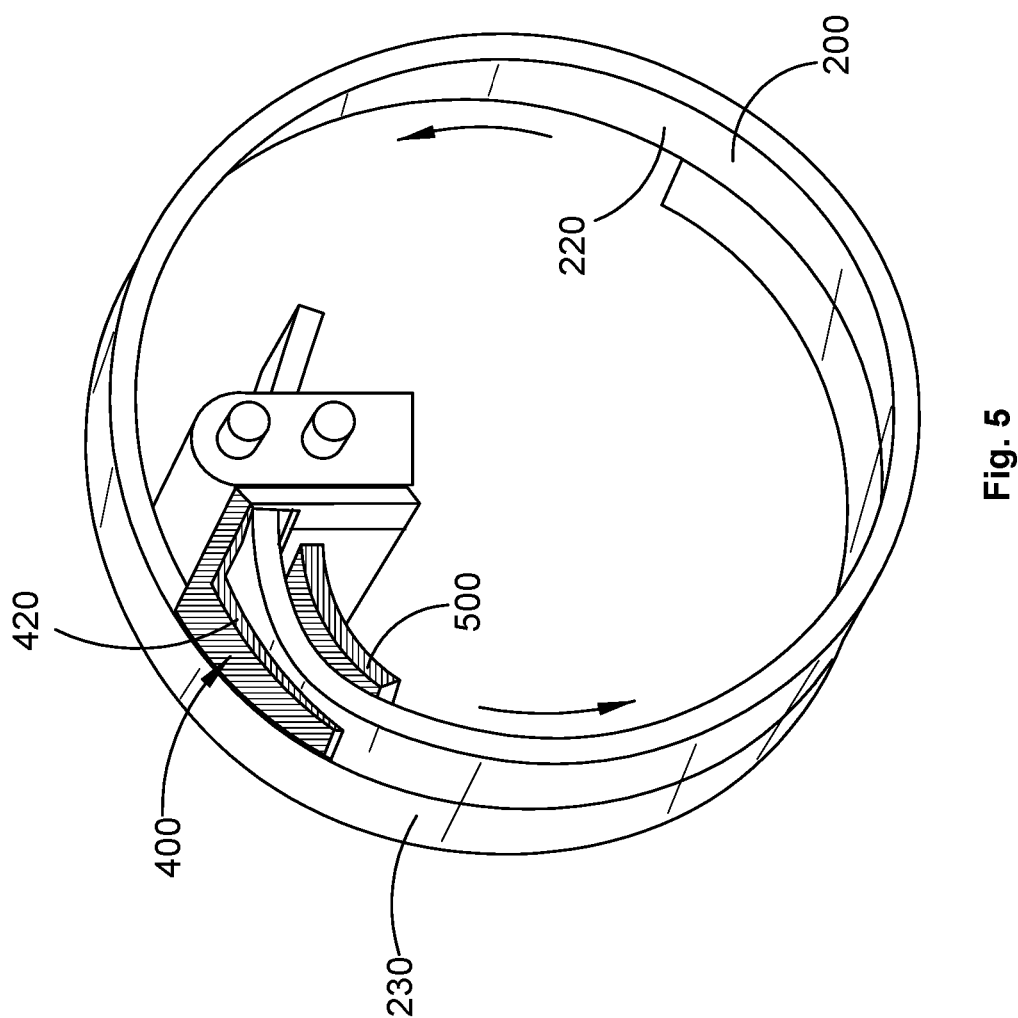
FIG. 5 is an illustrative perspective view of the machine of the invention together with partially wound web as shown in FIG. 3, and showing exterior and interior support means for pinching overlapping connecting formations of the web into interlocking engagement.

FIG. 5 is an illustrative perspective view of the machine of the invention together with partially wound web 200 as shown in FIG. 3, showing the configuration of the inner and outer support plates. For ease of illustration the ribs 350, 355 and connecting formations 310, 320 on the web 200 have been omitted. The exterior support means 400 takes the form of a fixed plate 420 over which the connecting formation at the terminus of the pipe slides and which acts as a rigid support to enable the connecting formation of the driven web 200 to be pinched together. As described above with reference to FIG. 3, the face of the support plate 420 may be profiled so as to be complementary to the web.

It will be appreciated that the combined action of the exterior support means 400, which is configured to be radially opposite an interior support surface 500, provides a net compressive force on the overlapping edges of the web 200 to interlock the overlapping edge portions together. In an alternative embodiment the exterior support means could be a roller positioned exterior to the connecting formations of the pipe being wound and or the interior compression roller can be a support plate.

In other embodiments, one or more of the ribs adjacent to the edge portions 300 could be an equivalent height as the joined edge portions in order to accommodate a wider support surface 400. For example, referring to FIG. 3 it can be seen that one of the ribs 355 is relatively reduced in size compared to the others 350 in order to accommodate a wider support surface, such as a roller.

The invention also relates to a machine for winding a helically wound pipe from a web 200 having complementary connecting formations 300 extending along opposite edge portions thereof and which are adapted to interlock when the web is helically wound. The machine comprises a frame (not shown) having circumferentially spaced guide rollers (not shown) adapted to bear against the inner periphery of the pipe being wound. The rollers form a guide to enable the web to follow a helical path along which the web is directed when the machine is in use. The machine also comprises web drive roller means (not shown) mounted to the frame for driving the web around the outside of the rollers so as to follow the helical path and cause the adjacent edge portions of adjacent convolutions of the web 200 to interlock. An external support means 400 and an internal support means 500 is provided and configured to bear against the locking members of the pipe being wound to cause the interlock of the adjacent edge portions of the web, as discussed above.

Figure 6:
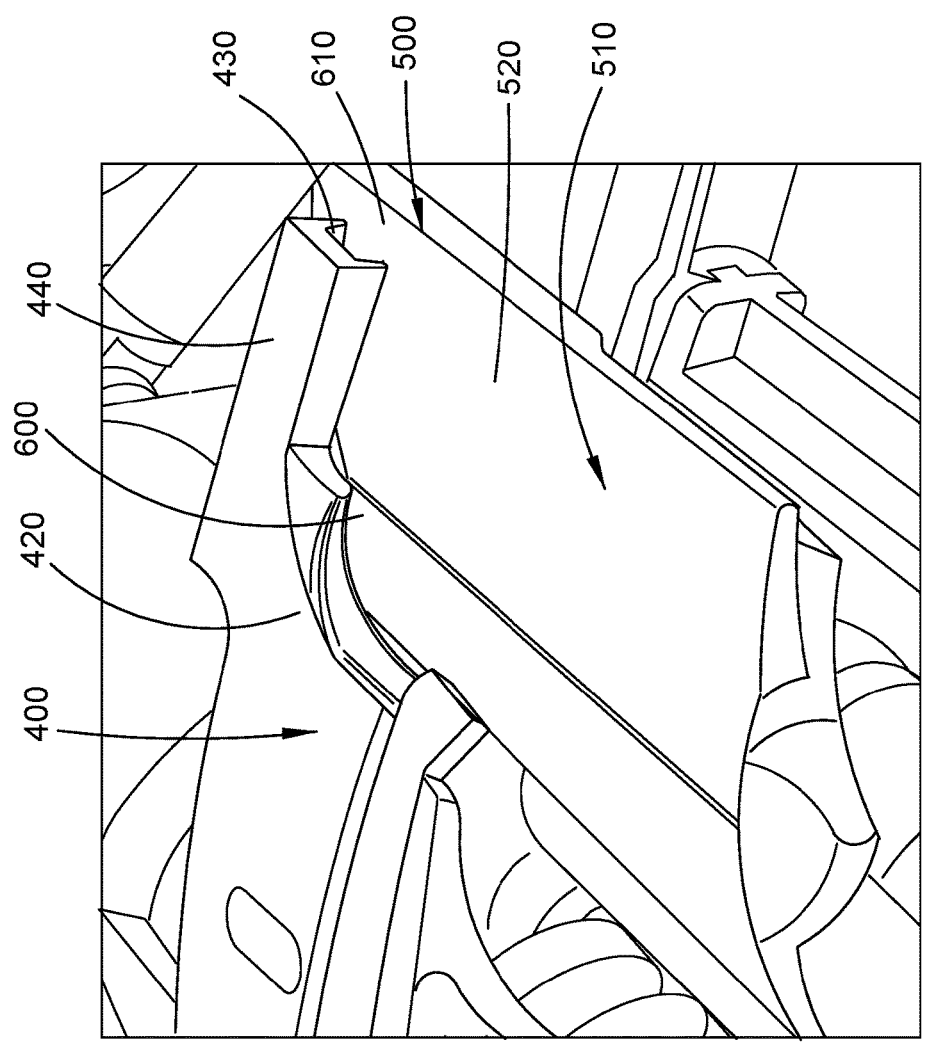
FIG. 6 is a perspective view of the machine depicted in FIG. 5, depicting the inner and outer support means for pinching overlapping connecting formations into interlocking engagement.

FIG. 6 provides an enlarged view of the outer and inner support means 400, 500.

The outer support means takes the form of a fixed plate 420. The plate 420 directly supports the web at the point of connection of the male and female locking formations. Plate 420 includes a finger 440, with an outer face of the female locking formation 320 directly supported by a complimentary support face 430 provided on finger 440. Support face 430 includes a complementary recess which receives an outer face of the female locking formation 320 and directly supports the web at the point of connection of the male and female locking formations.

Inner support means 500 takes the form of a guide plate 510. The guide plate 510 has a support face 520 over which the inner face 220 of the web passes. The support face 520 is inclined with respect to support face 430 so as to form a progressively converging zone 600 between the inner and outer support means. This progressively converging zone 600 is shaped substantially in the form of a "V" and creates a "nip point" 610 whereby the progressively converging plates cause the connecting formations of the driven web to be forced into interlocking engagement with the connecting formation at the terminus of the pipe being wound.

In accordance with the invention the outer support means 400 in the form of fixed plate 420 lies wholly within the outer diameter of the pipe being wound. As discussed above with reference to FIG. 3, this is achieved by the incorporation of spacer ribs 350 in the exterior face 230 of the web. The distal ends of the spacer ribs define the outer diameter of the pipe being wound. The spacer ribs 350 and the support plate 420 are respectively dimensioned such that support plate lies wholly within the spacing distance defined by the distal end of the spacer rib 350 and the exterior face 230 of the web.

Advantageously, the present invention enables the formation of a liner pipe that can be in intimate contact with the host pipe by using a winding machine that has an external pressure (compression) means or support surface located on the outside of the connecting formations of the liner pipe. Moreover, the ability to position a support surface within a small space between the connecting formations and the host pipe provides the benefit of being able to wind at large diameters reliably and without the need to have a relatively stiff web. Other technologies may employ an external pressure means however the liner cannot be produced such that it is in intimate contact with the host pipe.

The person skilled in the art will understand that the inventive method and apparatus may be embodied in forms other than that specifically described herein without departing from the spirit or scope of the present invention.

The invention claimed is:

1. A machine for winding a helically wound pipe from an elongated web, said web comprising a wall having complementary connecting formations extending along opposing edge portions thereof and which are adapted to interlock when the web is wound in a helical path and adjacent edge portions of the web overlap one another, said machine comprising:
   a frame having circumferentially spaced guide rollers adapted to bear against an inner periphery of the pipe being wound, the circumferentially spaced guide rollers forming a guide to enable the web to follow a helical path along which the web is directed when the machine is in use;
   web drive roller means mounted to the frame for driving/pulling the web around the outside of the rollers;
   drive means mounted to the frame for driving the web drive roller means, wherein the web drive roller means is located wholly inside the helical path;
   an exterior support means for supporting an outer face of the web;
   means for applying a radially outwardly directed force against an inner face of the driven web and the exterior support means, thereby pinching the overlapping connecting formations into interlocking engagement;
   wherein said wall of said web includes at least one spacer rib projecting therefrom;
   a distal end of said spacer rib defining an outermost diameter of the pipe being wound;
   wherein the distal end of the spacer rib and the wall define a spacing distance; and
   wherein said spacer rib and said exterior support means are respectively dimensioned such that as the pipe is wound said exterior support means is wholly located within said spacing distance.

2. The machine according to claim 1 wherein the distal end of the spacer rib and the wall define a spacing distance, wherein the said exterior support means is wholly located within said spacing distance as the pipe is wound.

3. The machine according to claim 1 wherein said means for applying a radially outwardly directed force comprises a roller biased in a radially outward direction.

4. The machine according to claim 1 wherein said exterior support means is a support plate.

5. The machine according to claim 1 wherein said exterior support means is a support plate, said support plate including a support face over which the outer face of the web passes as the liner is wound.

6. The machine according to claim 1 wherein said exterior support means directly supports the web at the point of connection of the overlapping connecting formations.

7. The machine according to claim 1 wherein said overlapping connecting formations comprise complementary male and female locking formations.

8. The machine according to claim 7 wherein an outer face of the female locking formation is directly supported by the exterior support means.

9. The machine according to claim 7 wherein a support face of the exterior support means includes a complementary recess which receives and supports the outer face of the female locking formation.

* * * * *